United States Patent [19]

Kneller

[11] Patent Number: 4,913,824
[45] Date of Patent: Apr. 3, 1990

[54] ANIONIC POLYMERS CONTAINING N-VINYL-PYRROLIDONE OR OTHER VINYL AMIDES AS SCALE INHIBITORS FOR PREVENTING OR REDUCING CALCIUM PHOSPHATE AND OTHER SCALES

[75] Inventor: James F. Kneller, La Grange Park, Ill.

[73] Assignee: Nalco Chemical Company, Naperville, Ill.

[21] Appl. No.: 253,355

[22] Filed: Sep. 29, 1988

Related U.S. Application Data

[63] Continuation of Ser. No. 101,628, Sep. 28, 1987, abandoned, which is a continuation-in-part of Ser. No. 730,609, May 6, 1985, abandoned, which is a continuation-in-part of Ser. No. 789,535, Oct. 21, 1985, abandoned.

[51] Int. Cl.$^4$ .................................. C02F 5/12
[52] U.S. Cl. ..................... 210/701; 252/180; 422/16
[58] Field of Search ............... 210/698–701; 252/180, 181; 422/16, 17

[56] References Cited

U.S. PATENT DOCUMENTS

| | | | |
|---|---|---|---|
| 3,331,773 | 7/1967 | Gunderson et al. | 210/701 |
| 3,806,367 | 4/1974 | Lange et al. | 210/701 |
| 3,900,338 | 8/1975 | Rumpf et al. | 210/701 |
| 4,071,508 | 1/1978 | Steckler | 210/681 |
| 4,288,327 | 9/1981 | Godlewski et al. | 210/698 |
| 4,532,046 | 7/1985 | Meunier et al. | 210/701 |
| 4,659,482 | 4/1987 | Chen | 210/701 |
| 4,663,053 | 5/1987 | Geiger | 210/701 |
| 4,673,508 | 6/1987 | Coleman et al. | 252/180 |
| 4,711,726 | 12/1987 | Pierce et al. | 210/701 |
| 4,740,314 | 4/1988 | Kneller | 210/698 |

OTHER PUBLICATIONS

"Mineql, A Computer Program for the Calculation of Chemical Equilibrium Composition of Aqueous Systems", Water Quality Laboratory, by J. C. Westall, et al, Ralph M. Parsons Laboratory for Water Resources & Environmental Engineering, Dept. of Civil Engineering, Mass. Institute of Technology, Technical Note No:18, sponsored by EPA Grant No:R-803738, Jul. 1976, pp. 8–10.

*Primary Examiner*—Peter Hruskoci
*Attorney, Agent, or Firm*—John G. Premo; Anthony L. Cupoli; Donald G. Epple

[57] ABSTRACT

A method of inhibiting scale, generally and specifically and preferably calcium phosphate and calcium carbonate scale, which is found on metal surfaces in contact with industrial cooling waters, boiler waters, oil well drilling waters, and evaporated sea water, which comprises treating the water present in such systems with a few ppm of a water-soluble anionic co- or terpolymer of N-vinyl-2-pyrrolidone (NVP) or vinyl amide. The preferred anionic comonomers are either acrylic or methacrylic acid.

7 Claims, No Drawings

ANIONIC POLYMERS CONTAINING N-VINYL-PYRROLIDONE OR OTHER VINYL AMIDES AS SCALE INHIBITORS FOR PREVENTING OR REDUCING CALCIUM PHOSPHATE AND OTHER SCALES

This is a continuation of co-pending application Ser. No. 101,628 filed on 9-28-87 which is a continuation-in-part application of copending Ser. No. 730,609, filed 5-6-85, now abandoned which was a continuation of U.S. Ser. No. 789,535 filed 10-21-85, now abandoned.

Certain boiler waters and many industrial waters such as those used in the operation of cooling towers are treated with a variety of inorganic and organic phosphorous-containing compounds. Such treatments tend to produce calcium phosphate scales which adhere to the metal surfaces of boilers and metallic heat exchangers.

Many of the known organic scale inhibitors and scale dispersants, both inorganic and those containing water-soluble polymers, while being effective against a wide variety of scales, are not entirely effective against calcium phosphate scales.

Pure calcium phosphate scales may exist as such but frequently are found as contaminants of calcium carbonate and calcium or magnesium salt scales. When such scales contain at least 10% of calcium phosphate, they are suitable for treatment with the scale inhibitors of the invention as will be more fully hereinafter defined.

THE INVENTION

A method of inhibiting scale, preferably calcium phosphate scale and including calcium and magnesium carbonate scale and slightly soluble zinc compounds, which are formed on metal surfaces in contact with industrial cooling waters, evaporated sea water, oil well drilling waters, and boiler waters, which comprises treating the water present in such systems with a few ppm of a water-soluble anionic co- or terpolymer which contains 5–50 mole percent of N-vinyl-2-pyrrolidone or other vinyl amide monomer. The preferred composition contains about 10 to 20 mole percent of N-vinyl-2-pyrrolidone or other vinyl amide monomer.

Exemplary polymers include the following:
A copolymer containing:
(meth)acrylic acid/vinyl amide
(meth)acrylic acid/N-vinyl pyrrolidone
A terpolymer containing:
acrylic acid/N-vinyl-N-methyl acetamide
acrylic acid/N-vinyl succinimide
acrylic acid/V-vinyl pyrrolidone/methacrylic acid
acrylic acid/N-vinyl pyrrolidone/methacrylamide
acrylic acid/N-vinyl pyrrolidone/(meth)acrylate esters The molecular weight of the polymers used in the practice of the invention is between 3,000–100,000 with a preferred molecular weight range being between the range of 5,000–40,000. This molecular weight is determined by aqueous gel permeation chromotography.

The amount of polymer added to industrial cooling water to prevent scale may be as little as ½ ppm up to dosages as high as 50–100 ppm. A typical dosage would be about 10 ppm. The exact dosage may only be determined by routine experimentation since the scale forming characteristics of a given industrial water will vary depending upon pH, concentration of scale-forming materials in the water, temperature, and other such variables.

ADVANTAGES OF THE INVENTION

A. Acrylic acid-N-vinylpyrrolidone or other vinyl amide polymers have calcium phosphate scale inhibitor activity equal to a sulfonated styrene-maleic acid polymer (see U.S. No. 4,288,327, the disclosure of which is incorporated herein by reference) commonly used in cooling water as a $Ca_3(PO_4)_2$ inhibitor (see Table I).

B. Vinylpyrrolidone and other vinyl amide polymers in general are stable in highly alkaline media while acrylate ester and vinyl ester based polymers are not. The acrylate ester and vinyl ester groups in the polymer would hydrolyze easily at high pH's (pH 11–13) used to make formulations containing tolyltriazole. Therefore, well known $Ca_3(PO_4)_2$ inhibitors such as inhibitors 2, 3 and 4 (see Table I) could not be used in the formulation while acrylic acid-NVP or vinyl amide polymers could be used. Since N-vinylpyrrolidone and other vinyl amides are secondary or tertiary amides, they should also be more hydrolytically stable than common amide monomers such as acrylamide and methacrylamide.

C. Acrylic acid-N-vinylpyrrolidone and other vinyl amide polymers can be made by a simple one-step polymerization process. In contrast, the polymers described in U.S. No. 4,288,327 are made by a two-step process involving the use of expensive equipment in order to handle sulfur trioxide or sulfonating reagents.

EVALUATION OF THE INVENTION

In order to evaluate the polymers of the invention, they were subjected to laboratory cooling water tests. The following test methods were used to evaluate the polymers for calcium phosphate scale inhibition and calcium carbonate scale inhibition.

TESTING OF THE POLYMERS AS CALCIUM PHOSPHATE INHIBITORS

Procedure of o-$PO_4$ Filtration Test $Ca_3(PO_4)_2$ Stabilization Test (Note all chemicals are reagent except for treatments)

1. Put 300 to 350 ml of DI water in the 600 ml jacketed beakers and let stand with mild stirring until temperature is brought to 150 degrees F. (70 degrees C.) by use of a constant temperature water bath.
2. Put in required ml of stock hardness into jacketed beakers: for 250 ppm $CaCO_3$, use 50 ml of stock solution:

To make 2 liters of stock solution:

(1) Dissolve 7.356 g $CaCl_2 2H_2O$ in 800 ml DI $H_2O$.
(2) Dissolve 6.156 g $MgSO_4 7H_2O$ in 800 ml DI $H_2O$.
(3) Add both solutions to 2 liter volumetric flask and dilute to volume.
(4) Shake well.

3. Add sufficient ml of treatment into jacketed beakers while stirring (normally 5 mls for 10 ppm of treatment).
4. Add DI water to make 500 ml in jacketed beakers.
5. With stirring, let solutions in beakers equilibrate to 158° F.
6. With stirring, adjust pH to 8.5 with dilute (0.1–0.4N) NaOH.

7. Add 5 ml of 1000 ppm PO$_4$, pH-8.5 solution to jacketed beakers and wait about 3-5 minutes while stirring.

8. Check pH of solution in beakers and as necessary adjust pH to 8.5 while stirring.

9. Let experiment run at 158° F. with stirring for 4 hours.

10. After 15 minutes, check pH of solutions in beakers and as necessary, adjust pH to pH 8.5 0.1. Also, check pH of solutions every 30 to 45 minutes thereafter.

11. After the 4 hours are up, the solution is immediately filtered through 0.45 micron filter paper under vacuum. The filtered solution is analyzed for o-PO$_4$ using standard procedure and the color is evaluated in the spectrophotometer at 700 nm.

12. The results are reported as percent inhibition calculated by the following formula:

$$\text{inhibition} = \frac{(\text{residual o-PO}_4) - \text{blank residual o-PO}_4)}{(\text{initial o-PO}_4) - (\text{blank residual o-PO}_4)} \times 100$$

where:

initial-o-PO$_4$=o-PO$_4$ concentration in the mixture at the beginning of the experiment.

residual-o-PO$_4$=o-PO$_4$ concentration in the mixture at the end of the experiment with stabilizer.

blank residual-o-PO$_4$=o-PO$_4$ concentration in the filtrate at the end of the experiment with no stabilizer.

Calcium Carbonate Inhibition Test

The apparatus is based upon a Mettler automatic titration system. The E-px converter was calibrated according to the two buffer-two temperature method described in the Mettler DK12 E-px converter manual. This calibraton allows the equipment to compensate the pH values for temperature changes over a range of 20°-70° C. The Mettler E-px converter output is 100 MV/pH unit. This signal is recorded as the *observed* MV change as the titration progresses, and the pH of the titration breakpoint is most readily obtained from the observed MV values. To convert over to *true* MV changes, multiply the observed MV change times the decimal equivalent of the value on the d E/d px dial. A standard pH 7 (pH 6.98 at 60° C.) buffer solution was prepared from Beckman buffer powder and employed to determine the −1 MV (true) reference point after each titration. A stock hardness solution containing 3600 ppm Ca$^{2+}$ and 2000 ppm Mg$^{2+}$ (equivalent to 20X Synthetic #3 PCT test water) is prepared using CaCl$_2$2-H$_2$O and MgSO$_4$7H$_2$O. A 2200 ppm HCO$_3$ solution was prepared each day using NaHCO$_3$, and the 0.1N NaOH titrant is prepared using an Acculate reagent solution. To a 100 ml volumetric flask is added the inhibitor, hardness (20 mL), and bicarbonate (20 mL) solutions followed by dilution with distilled water. The solution is swirled gently to mix the reagents, then transferred to a 300 mL jacketed-Pyrex beaker maintained at 60° C. The initial reagent concentrations are 360 ppm Ca$^{2+}$, 200 ppm Mg$^{2+}$, 440 ppm HCO$_3$. Generally dosage preferance curves are obtained using 5, 10, or 15 ppm inhibitor actives (0.5, 1.0, or 1.5 mL of stock solution). The test solution is stirred for 6 min. to allow for temperature equilibration. Dispensing tip for the NaOH titrant is placed just above the test solution surface. Next, the pH electrode is lowered as far as possible into the solution, but maintaining clearance above the magnetic stirbar. The titrant is added at 0.3 mL/min (buret drive unit rate=2) until the strip-chart recorder indicates a small pH drop has occurred. It should be noted that many test solutions exhibit significant turbidity before the actual pH breakpoint (associated with massive CaCO$_3$ precipitation) is observed. If additional base was added, a second break-point associated with Mg(OH)$_2$ precipitation usually is observed at higher pH values. After the breakpoint is reached, several mL of 10% HCl is added to the test solution to dissolve the precipitated CaCO$_3$. After each titration, the pH electrode is transferred to the standard pH 6.98 (−1 MV, true) buffer, which is maintained at 60° C., and this reference point is indicated on the recorder. After rinsing the jacketed-beaker with deionized water, a new test solution is added. A calibration check is made daily by titrating a test sample containing 10 ppm actives Dequest 2010 (hydroxy ethylidene diphosphonic acid) (120 MV, true). Relative error of this titration method generally is 1% (daily) and 2% (weeks). Saturation ratios (S.R.) are calculated using the method as described by J. C. Westall, et al. entitled, "Mineol, A Computer Program for the Calculation of Chemical Equilibrium Composition of Aqueous Systems," Water Quality Laboratory, Ralph M. Parons Laboratory for Water Resources and Environmental Engineering, Department of Civil Engineering, Massachusetts Institute of Technology, Technical Note No. 18, Sponsored by EPA Grant No. R-803738, July, 1976, pp. 8-10.

The results of testing various NVP co- and terpolymers are set forth below in Tables I and II.

TABLE I

Calcium Phosphate Scale Inhibitor Tests[1]
of N-Vinylpyrrolidone and Vinyl Amide Polymers

| Composition Number | Sample Composition | Mole Ratio (%) | MW[2] (GPC) | % Inhib. ppm Dosage 10 | 20 | Comments |
|---|---|---|---|---|---|---|
| Comm. Inh. 1 | Sulf. styrene Maleic acid | 75:25 | 18,950 | 85 | | Reference polymer |
| Comm. Inh. 2 | AA/HPA* | 75:25 | 7,350 | 72 | | Reference polymer |
| Comm. Inh. 3 | AA/MeA | 83:17 | 5,780 | 92 | | Reference polymer |
| Comm. Inh. 4 | AA/EA | 85:15 | 3,930 | 62 | | Reference polymer |
| Polymer 5 | AA/NVP | 80:20 | 5,930 | 76 | | |
| Polymer 6 | AA/NVP | 70:30 | 7,760 | 10 | | |
| Polymer 7 | AA/NVP | 60:40 | 8,210 | 14 | | |
| Polymer 8 | AA/NVP | 80:20 | 6,250 | 77 | | |
| Polymer 9 | AA/NVP | 80:20 | 6,950 | 87 | | |
| Polymer 10 | AA/NVP | 80:20 | 6,610 | 86 | | |
| Polymer 11 | AA/MAA/NVP | 60:20:20 | 11,200 | 88 | | |

TABLE I-continued

Calcium Phosphate Scale Inhibitor Tests[1]
of N-Vinylpyrrolidone and Vinyl Amide Polymers

| Composition Number | Sample Composition | Mole Ratio (%) | MW[2] (GPC) | % Inhib. ppm Dosage 10 | % Inhib. ppm Dosage 20 | Comments |
|---|---|---|---|---|---|---|
| Polymer 12 | AA/NMVAD | 80:20 | 6,300 | 80 | | |
| Polymer 13 | AA/NVP | 90:10 | 5,950 | 54 | 98 | |
| Polymer 14 | AA/NVP | 80:20 | 19,600 | 79 | — | |
| Polymer 15 | AA/NVP | 80:20 | 36,500 | 80 | — | |
| Polymer 16 | AA/NVP | 80:20 | 86,100 | 29 | 73 | |
| Polymer 17 | AA/VA/NVP | 60:20:20 | 5,740 | 23 | 68 | |
| Polymer 18 | AA/MMA/NVP | 60:20:20 | 10,800 | 77 | | |
| Polymer 19 | AA/MAM/NVP | 60:20:20 | 12,000 | 62 | | |
| Polymer 20 | MAA/NVP | 80:20 | 36,200 | 20 | | |
| Polymer 21 | AA/NVSI | 80:20 | 5,480 | 6 | 20 | |
| Polymer 22 | AA/NVP | 70:30 | 20,000 | 57 | 88 | |
| Polymer 23 | AA/NVSI | 80:20 | 32,000 | 85 | | |

*See Glossary.
[1]All screening tests done using water containing 250 ppm of Ca (as $CaCO_3$), 125 ppm Mg (as $CaCO_3$), pH maintained at 8.5, no iron added, tests run for 4 hrs. before filtering off and $Ca_3(PO_4)_2$ precipitate.
[2]Molecular weights determined by GPC in aqueous solution using sulfonated polystyrene standards.

GLOSSARY

| | |
|---|---|
| Comm. Inh. = | Commercial Inhibitor |
| AA = | acrylic acid |
| EA = | ethyl acrylate |
| HPA = | 2-hydroxypropyl acrylate |
| MeA = | methyl acrylate |
| MAA = | methacrylic acid |
| NVP = | N-vinylpyrrolidone |
| NMVAD = | N-methyl-N-vinylacetamide |
| VA = | vinyl acetate |
| MMA = | methyl methacrylate |
| MAM = | methacrylamide |
| NVSI = | N-vinylsuccinimide |

TABLE II

Calcium Carbonate Scale Inhibitor Tests
of N-Vinylpyrrolidone and Vinyl Amide Polymers

| Composition Number | Sample Composition | Mole Ratio (%) | MW[1] (GPC) | $CaCO_3$ (S.R.)[2] ppm Dosage 10 | $CaCO_3$ (S.R.)[2] ppm Dosage 15 |
|---|---|---|---|---|---|
| Blank | | | | 10 | 10 |
| Polymer 5 | AA/NVP | 80:20 | 5,930 | 98 | 115 |
| Polymer 8 | AA/NVP | 80:20 | 6,200 | 108 | 126 |
| Polymer 10 | AA/NVP | 80:20 | 6,610 | 106 | 126 |
| Polymer 9 | AA/NVP | 80:20 | 7,000 | 106 | 115 |
| Polymer 16 | AA/NVP | 80:20 | 86,100 | 103 | 117 |
| Polymer 6 | AA/NVP | 70:30 | 7,800 | 50 | 56 |
| Polymer 7 | AA/NVP | 60:40 | 8,200 | 64 | 65 |
| Polymer 11 | AA/MAA/NVP | 60:20:20 | 11,200 | 95 | 110 |
| Polymer 12 | AA/NMVAD | 80:20 | 6,300 | 94 | 111 |
| Polymer 17 | AA/VA/NVP | 60:20:20 | 5,740 | 84 | 85 |

[1]Molecular weights determined by GPC in aqueous solution using sulfonated polystyrene standards.
[2]S.R. = saturation ratio.

I claim:

1. A method of inhibiting calcium phosphate scale or calcium carbonate scale which is formed on metal surfaces in contact with industrial cooling waters, which comprises treating the water with a formulation having a pH of 11–13 containing tolyltriazole, and from ½ to 100 ppm of water-soluble anionic co- or terpolymer which contains about 10–20 mole percent of a vinyl amide mer unit and said co- or terpolymer is selected from the group consisting of a copolymer containing only acrylic acid and N-vinyl pyrrolidone, a copolymer containing only acrylic acid and N-vinyl-N-methyl acetamide; a copolymer containing only acrylic acid and N-vinyl succinimide; a terpolymer containing only acrylic acid, N-vinyl pyrrolidone and methacrylic acid; a terpolymer containing only acrylic acid and N-vinyl pyrrolidone and methacrylamide; and a terpolymer containing only acrylic acid, N-vinyl pyrrolidone and a (meth)acrylate ester where said co- or terpolymer has a molecular weight range between about 5000–40,000.

2. A method of claim 1 wherein the polymer consists essentially of a copolymer containing only acrylic acid and N-vinyl pyrrolidone.

3. A method of claim 1 wherein the polymer consists essentially of a copolymer containing only acrylic acid and N-vinyl-N-methyl acetamide.

4. A method of claim 1 wherein the polymer consists essentially of a copolymer containing only acrylic acid and N-vinyl succinimide.

5. A method of claim 1 wherein the polymer consists essentially of a terpolymer containing only acrylic acid, N-vinyl pyrrolidone and methacrylic acid.

6. A method of claim 1 wherein the polymer consists essentially of a terpolymer containing only acrylic acid, N-vinyl pyrrolidone and methacrylamide.

7. A method of claim 1 wherein the polymer consists essentially of a terpolymer containing only acrylic acid, N-vinyl pyrrolidone and (meth)acrylate esters.

* * * * *